United States Patent
Shafer et al.

(10) Patent No.: US 8,820,823 B1
(45) Date of Patent: Sep. 2, 2014

(54) VEHICLE FRAME STRUCTURE

(71) Applicant: Honda Motor Co., Ltd., Tokyo (JP)

(72) Inventors: Patrick M. Shafer, Hilliard, OH (US); Brian E. Dressel, Columbus, OH (US); Takashi Nakano, Columbus, OH (US); Kishore K. Pydimarry, Dublin, OH (US); Brandon D. Koester, Marysville, OH (US); Patrick J. Ellison, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/796,390

(22) Filed: Mar. 12, 2013

(51) Int. Cl.
*B62D 25/20* (2006.01)
*B62D 21/00* (2006.01)

(52) U.S. Cl.
CPC ..................................... *B62D 21/00* (2013.01)
USPC ....................... 296/204; 296/193.07; 296/209

(58) Field of Classification Search
CPC ...... B62D 25/08; B62D 25/085; B62D 25/20; B62D 25/2009; B62D 25/2018
USPC ........... 296/203.01, 203.02, 204, 193.07, 209
See application file for complete search history.

(56) References Cited

U.S. PATENT DOCUMENTS

| | | | |
|---|---|---|---|
| 6,206,460 B1 * | 3/2001 | Seeliger et al. | 296/204 |
| 6,619,730 B2 | 9/2003 | Porner | |
| 7,032,961 B2 | 4/2006 | Matsuda | |
| 7,201,433 B2 | 4/2007 | Herntier et al. | |
| 7,338,115 B2 | 3/2008 | Rocheblave et al. | |
| 7,699,384 B2 | 4/2010 | Duerr et al. | |
| 7,854,474 B2 * | 12/2010 | Cox | 296/204 |
| 7,905,541 B2 | 3/2011 | Yamaguchi et al. | |
| 8,011,695 B2 | 9/2011 | Kosaka et al. | |
| 8,186,735 B2 * | 5/2012 | Maceri et al. | 296/37.14 |
| 2012/0133177 A1 | 5/2012 | Baccouche et al. | |
| 2012/0212009 A1 * | 8/2012 | Ishizono et al. | 296/193.07 |
| 2012/0256446 A1 * | 10/2012 | Yasuhara et al. | 296/193.07 |
| 2012/0274100 A1 * | 11/2012 | Mildner et al. | 296/193.07 |

FOREIGN PATENT DOCUMENTS

JP 2003118632 4/2003

* cited by examiner

*Primary Examiner* — Dennis H Pedder
(74) *Attorney, Agent, or Firm* — Rankin, Hill & Clark LLP

(57) ABSTRACT

A vehicle body structure includes a floor connected to a main frame assembly. The main frame assembly includes first and second side rails and interconnecting cross-members. A front frame structure located near a forward part of the vehicle body structure is connected to the main frame assembly. The front frame structure includes first and second diagonal members and a laterally extending member. Each of the first and second diagonal members includes a forward end portion connected to the main frame assembly and a rearward end portion connected to the lateral member. The rearward end portions converge toward one another and the lateral member is connected to the first and second side rails. The front frame structure transfers an impact load caused by a narrow offset frontal collision from the first side rail to the second side rail by transferring the load through the front frame structure.

15 Claims, 6 Drawing Sheets

VEHICLE FRAME STRUCTURE

BACKGROUND

Current standard frontal crash tests include full frontal or moderate overlap frontal (e.g., 40% offset). Frontal impacts with less than 40% offset and corner impacts have previously received little attention. The small overlap or narrow offset frontal crash test (e.g., 25% offset) is a newly emerging crash requirement associated with frontal impacts with less than 40% offset and corner impacts. The test is designed to replicate what happens when the front corner of a vehicle collides with another vehicle or an object like a tree or utility pole.

Most vehicles have safety cages that encapsulate the occupant compartment and are built to withstand head-on collisions and moderate overlap frontal crashes with little deformation. At the same time, crush zones help manage crash energy to reduce forces on the occupant compartment. The main crush-zone structures are typically concentrated in the middle 50% percent of the front end. When a crash involves these structures, the occupant compartment is protected from intrusion, and front airbags and safety belts restrain and protect occupants. The small overlap frontal crashes primarily affect a vehicle's outer edges, which generally are not well protected by the crush-zone structures. As such, crash forces can go directly into the front wheel, suspension system and firewall.

BRIEF DESCRIPTION

In accordance with one aspect, a vehicle body structure comprises a floor connected to a main frame assembly. The main frame assembly includes first and second side rails which extend in a longitudinal direction of the vehicle body structure and a plurality of spaced cross-members interconnecting the first and second side rails. A front frame structure located near a forward part of the vehicle body structure is connected to the main frame assembly. The front frame structure includes first and second diagonal members and a laterally extending member. Each of the first and second diagonal members includes a forward end portion connected to the main frame assembly and a rearward end portion connected to the lateral member. The rearward end portions converge toward one another and the lateral member has end portions connected to the first and second side rails. The front frame structure is configured to transfer an impact load to the vehicle body structure caused by a narrow offset frontal collision from the first side rail to the second side rail by transferring the load through the diagonal member extending toward the first side rail, through the lateral member and toward the second side rail.

In accordance with another aspect, a vehicle body structure comprises a floor connected to a main frame assembly. The main frame assembly includes first and second side rails which extend in a longitudinal direction of the vehicle body structure and a plurality of spaced cross-members interconnecting the first and second side rails. A front subframe is connected to the main frame assembly. A front frame structure located rearward of the front subframe is connected to the main frame assembly. The front frame structure includes first and second diagonal members and a laterally extending member connected to each of the first and second diagonal members. The first and second diagonal members extend from a central portion of the lateral member forward and outward toward the first and second side rails. Forward end portions of the first and second diagonal members are spaced inwardly of the first and second side rails. The front frame structure is configured to transfer an impact load to the vehicle body structure caused by a narrow offset frontal collision from one of the first side rail and second side rail toward the other of the first side rail and second side rail via the diagonal member extending toward the narrow offset frontal collision and the lateral member.

In accordance with yet another aspect, a vehicle body structure comprises a floor connected to a main frame assembly. The main frame assembly includes first and second side rails which extend in a longitudinal direction of the vehicle body structure and a plurality of spaced cross-members interconnecting the first and second side rails. A front subframe is connected to the main frame assembly. A front frame structure located rearward of the front subframe is connected to the main frame assembly. The front frame structure includes first and second diagonal members and a laterally extending member connected to each of the first and second diagonal members. The first and second diagonal members extend from a central portion of the lateral member toward the first and second side rails. Each of the first and second diagonal members includes a forward member and a separate rearward member connected to the forward member. The forward member is connected to one of the cross-members and the rearward member is connected to the lateral member. The front frame structure is configured to transfer an impact load to the vehicle body structure caused by a narrow offset frontal collision from one of the first side rail and second side rail toward the other of the first side rail and second side rail via the diagonal member extending toward the narrow offset frontal collision and the lateral member.

DETAILED DESCRIPTION

It should be understood that the description and drawings herein are merely illustrative and that various modifications and changes can be made in the structures disclosed without departing from the present disclosure. In general, the figures of the exemplary vehicle frame structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle frame structure disclosed herein are merely terms of art that may vary from one manufacturer to another and should not be deemed to limit the present disclosure.

Figure 1:
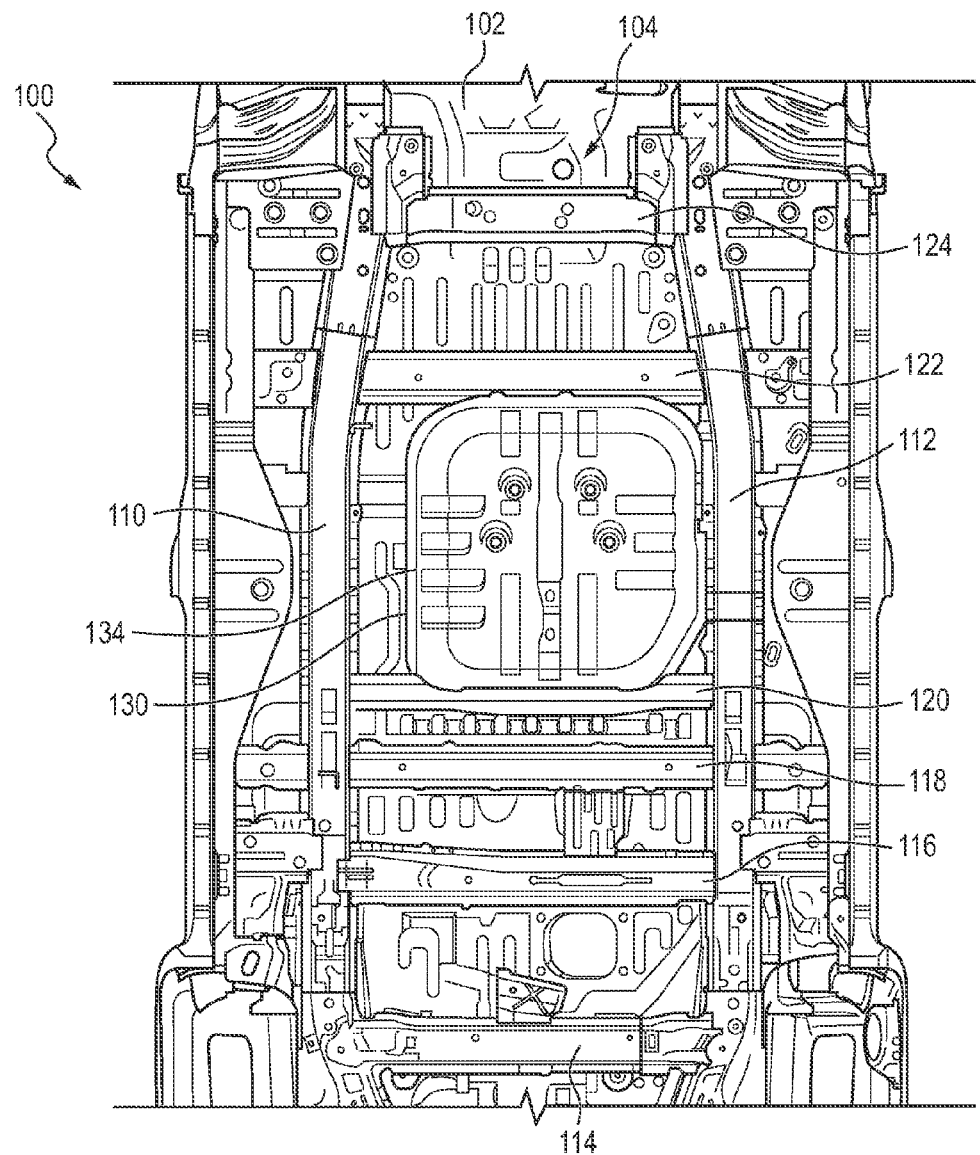
FIG. 1 is a plan view of a known vehicle body structure including a floor connected to a main frame assembly.

Referring now to the drawings, wherein like numerals refer to like parts throughout the several views, FIG. 1 illustrates a known floor structure 100 for a vehicle. The floor structure 100 includes a floor 102 connected to a main frame assembly 104. As is known in the art, the main frame assembly 104 includes first and second longitudinal members or rails 110, 112 with lateral cross-members 114, 116, 118, 120, 122, 124 that span between and interconnect the longitudinal members 110, 112. In the depicted minivan platform, the area under and behind the front row of seats includes a well 130. The well is defined by an opening provided in the floor 102 to allow access to the well and a cover 134 for covering the opening. The cover 134 is mounted to at least one of the floor 102 and the cross-members 120, 122. The opening provided in the vehicle floor 102 can reduce the floor's ability to act as a complete shear panel during a crash event. In small overlap (25%) frontal impacts, a large amount of total energy can strike the A-pillar (not shown) directly without engaging the vehicle's primary frontal crash structure (not shown). The loading is highly asymmetric, can cause buckling (i.e., matchboxing) of the floor structure 100.

Figure 2:
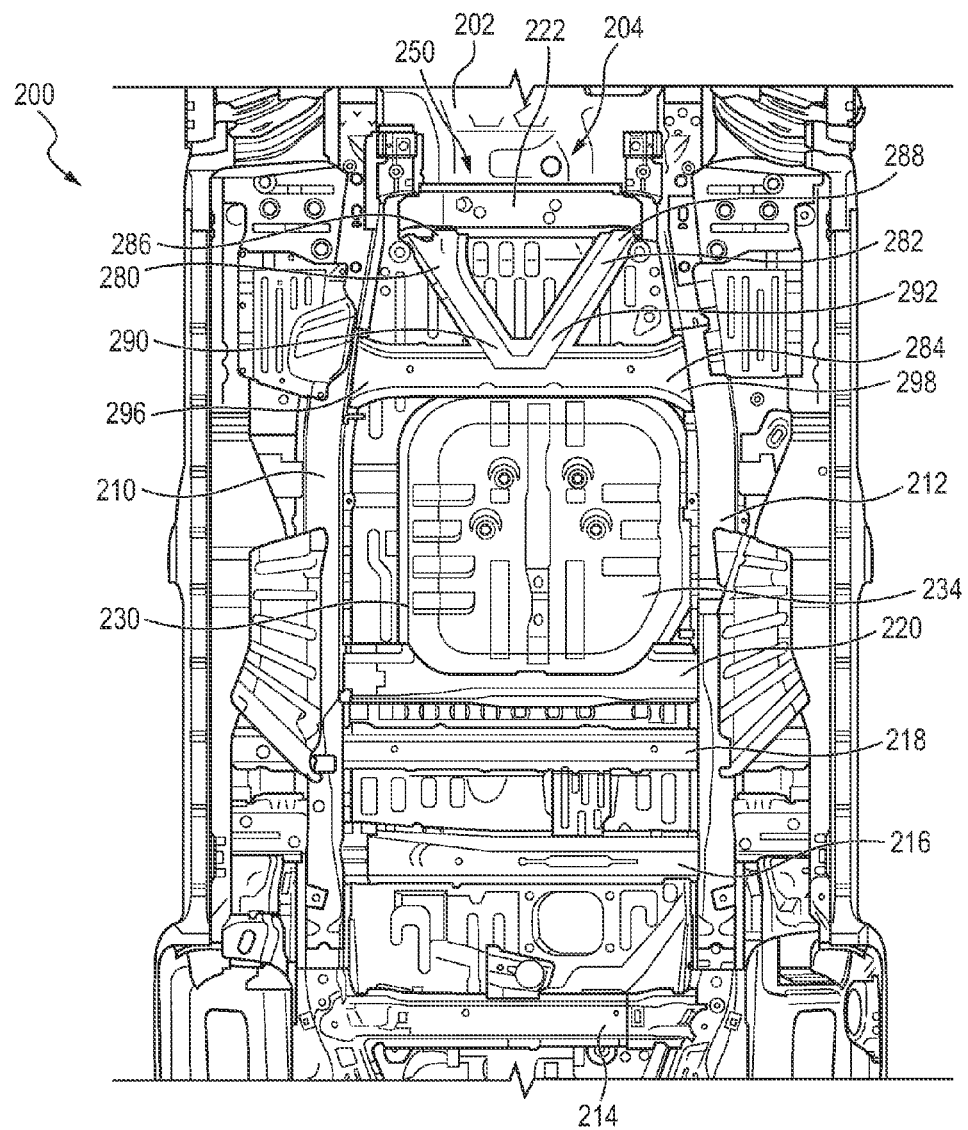
FIG. 2 is a plan view of a vehicle body structure according to the present disclosure, the vehicle body structure including a floor connected to a main frame assembly, and an exemplary front frame structure located near a forward part of the vehicle body structure.

FIG. 2 illustrates an exemplary vehicle floor structure 200 according to the present disclosure. The exemplary vehicle frame structure 200 will also be described for use with a minivan platform (see FIGS. 3 and 4), though this is merely illustrative and it is to be appreciated by those skilled in the art that the vehicle frame structure could easily be adapted to other vehicle platforms, such as sport utility vehicles, vans, cars, crossovers, etc. Similar to floor structure 100, vehicle floor structure 200 includes a floor 202 connected to a main frame assembly 204. The main frame assembly 204 includes first and second longitudinal members or rails 210, 212 with lateral cross-members 214, 216, 218, 220, 222 that span between and interconnect the longitudinal members 210, 212. Each of the first and second rails 210, 212 has a common cross-sectional profile that remains constant along at least a longitudinal portion thereof, and in the present disclosure, each of the first and second rails is formed in a channel or a U sectional shape. The lateral cross-members are shaped similar to the first and second side rails 210, 212. In the depicted minivan platform, the area under and behind the front row of seats includes a well 230. The well is defined by an opening provided in the floor 202 to allow access to the well and a cover 234 for covering the opening. The cover 234 is mounted to at least one of the floor 202 and one of the cross-members.

The exemplary vehicle frame structure 200 further includes a front subframe 240 (see FIGS. 3 and 4) and a front frame structure 250, each being connected to the main frame assembly 204. As is well known, the front subframe 240 is suspended from front portions of first and second side rails 210, 212 via left front and rear and right front and rear vibration preventive elastic of respective front and rear bushing mounts 252, 254. As shown, the front subframe 240 includes left and right longitudinal members 260, 262 which extend in a longitudinal direction of the vehicle body. A front cross-member 264 extends in a transverse direction of the vehicle body so as to extend between front ends of these longitudinal members 260, 262. As shown, the front cross-member 264 is located rearward of respective engagement members 268, 270 provided on the left and right longitudinal members 260, 262. A rear cross-member 272 extends in the transverse direction of the vehicle body so as to extend between rear ends of the left and right longitudinal members 260, 262.

Figure 4:
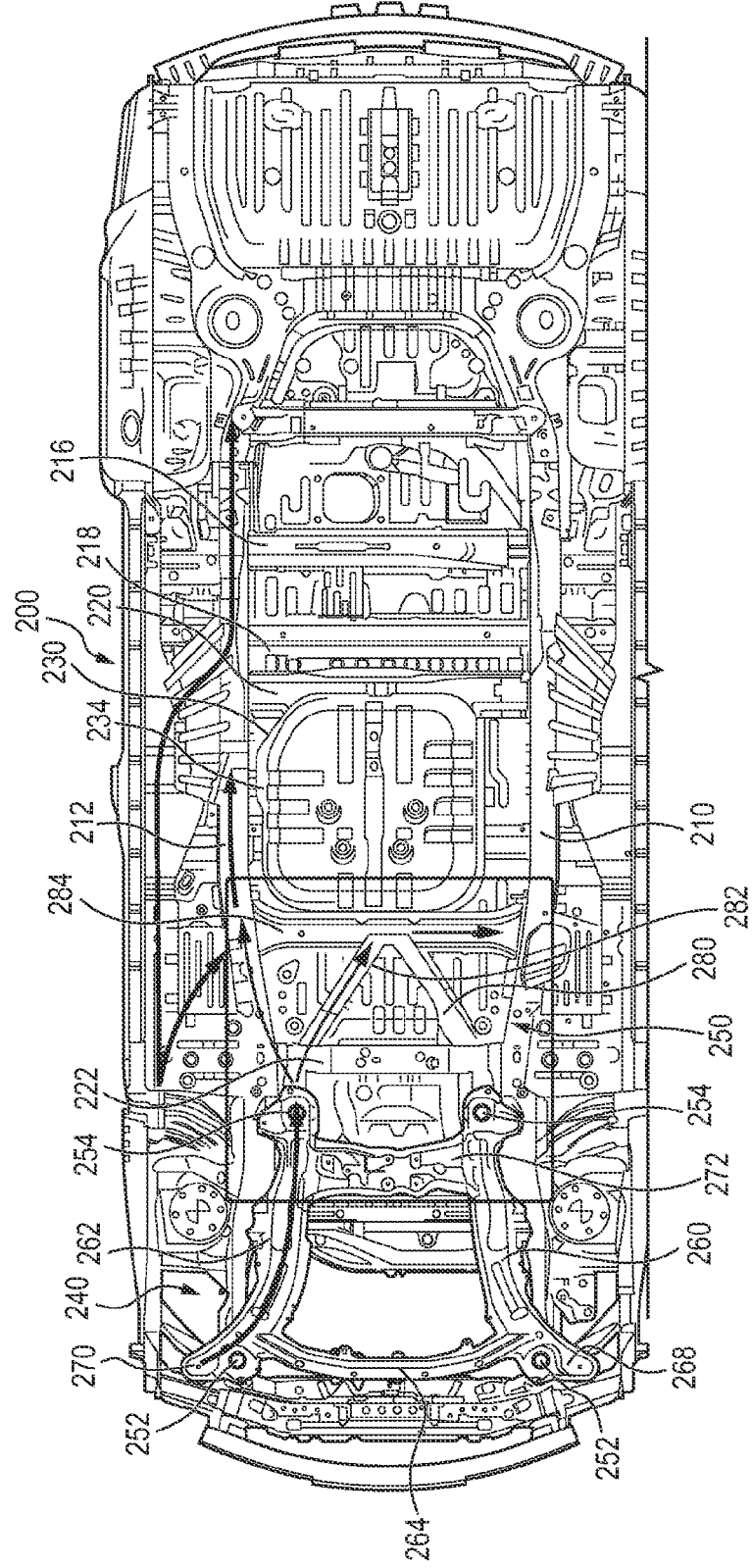
FIG. 4 is a plan view of the vehicle of FIG. 3 showing the load path caused by a narrow offset frontal collision.

The engagement members 268, 270 as part of the front subframe 240 are adapted for a narrow offset crash, and internal reinforcement(s) can be added to the front subframe to increase subframe load carrying capacity. The engagement members 268, 270 of the front subframe 240 are located on the front ends of the left and right longitudinal members 260, 262, and extend laterally outwardly from the front ends of the left and right longitudinal members forward of the front cross-member 264. As shown in FIG. 4, with the construction of the front subframe 240, during a narrow offset frontal collision, one of the engagement members 268, 270 of the front subframe engages a barrier, and this engagement allows crash forces to be directed into the front subframe 240 and the front frame structure 250.

Figure 3:
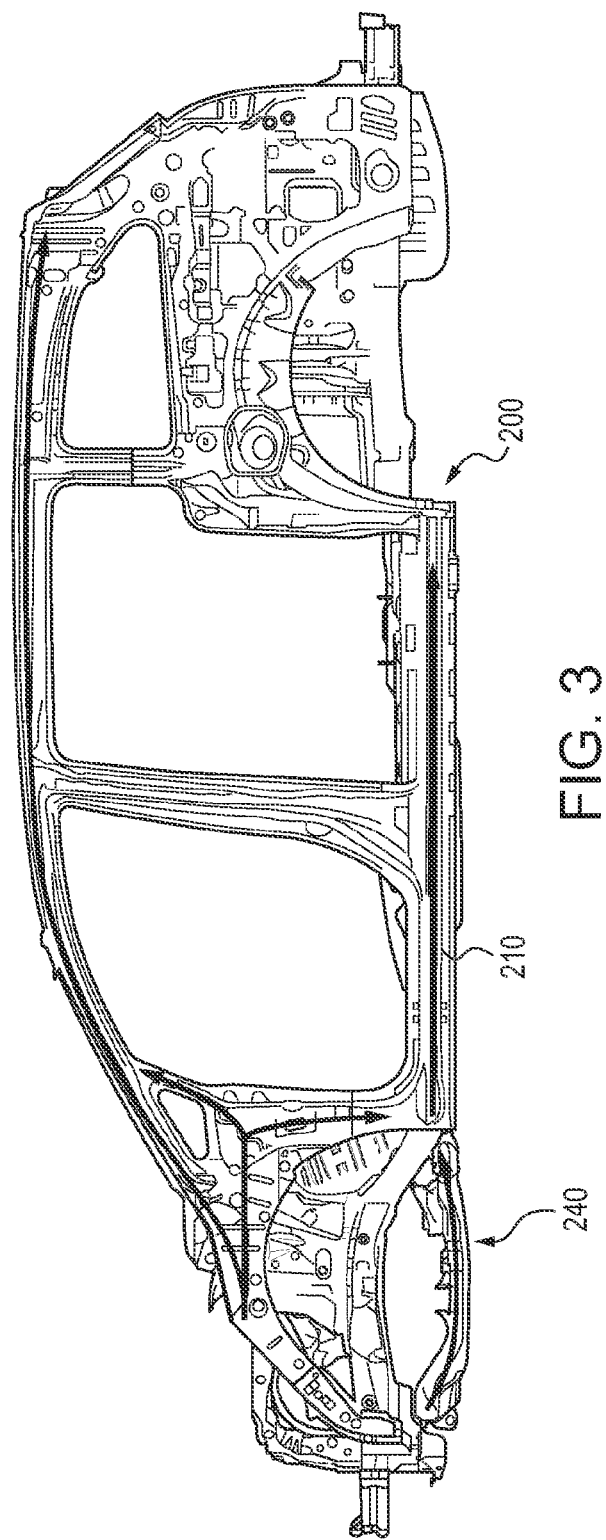
FIG. 3 is a side view of a vehicle including the vehicle body structure of FIG. 2, FIG. 3 showing a load path caused by a narrow offset frontal collision.

With reference again to FIG. 2, the front frame structure 250 is located near a forward part of the vehicle body structure 200 and rearward of the front subframe 240. The front frame structure 250 includes first and second diagonal members 280, 282 and a laterally extending member 284. Each of the first and second diagonal members 280, 282 and laterally extending member 284 has a common cross-sectional profile that remains constant along at least a longitudinal portion thereof. In the present disclosure, each first and second diagonal members and lateral member is formed in a channel or a U sectional shape. As shown in FIG. 4, the front subframe 240 is located adjacent the first and second diagonal members 280, 282 and is separated from the front frame structure 250 by cross-member 222. Each of the first and second diagonal members 280, 282 includes a respective forward end portion 286, 288 connected to the main frame assembly 204 and a respective rearward end portion 290, 292 connected to the lateral member 284. The rearward end portions 290, 292 converge toward one another. The lateral member 284 has respective end portions 296, 298 connected to the first and second side rails 210, 212. With the depicted layout of the first and second diagonal members 280, 282 and lateral member 284, the front frame structure 250 is substantially K-shaped. As shown in FIGS. 3 and 4, the front frame structure 250 is configured to transfer an impact load to the vehicle body structure 200 caused by a narrow offset frontal collision from one of the first and second side rails (the second side rail 212 in FIG. 4) to the other of the first and second side rails (the first side rail 210 of FIG. 4) by transferring the load through the diagonal member extending toward the one side rail (i.e., diagonal member 282), through the lateral member 284 and toward the other side rail. Further, the front frame structure 250 is positioned adjacent to and forward of the well 230. With this layout, the well 230 is flanked by one of the cross-members (i.e., cross-member 220) and the lateral member 284 of the front frame structure 250, which transfers the impact load is away from the well 230.

Figure 5:
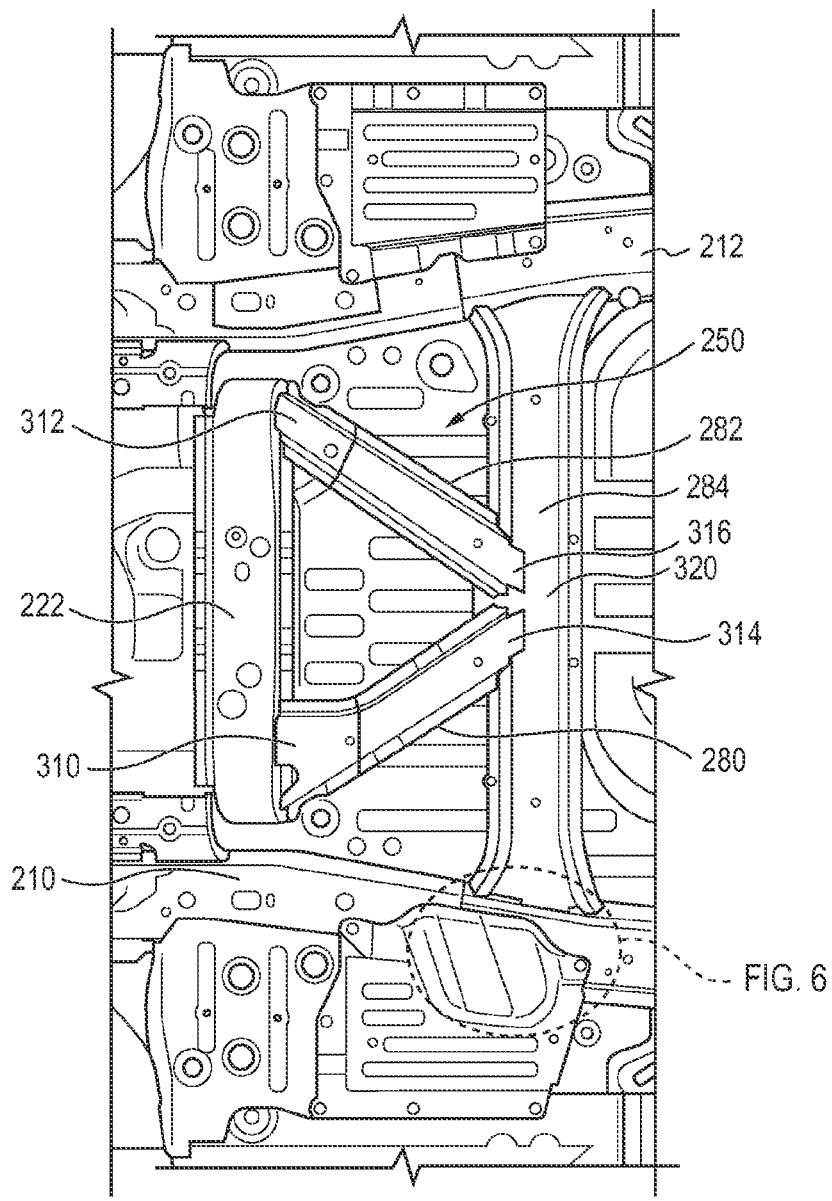
FIG. 5 is a plan view of the front frame structure of FIG. 2 according to one aspect of the present disclosure.
Figure 6:
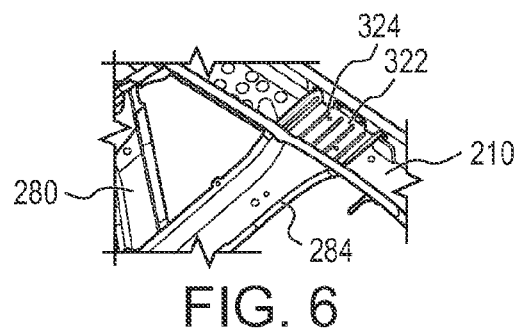
FIG. 6 is a detail view of a portion of the vehicle body structure illustrated in FIG. 5.

As indicated above, the first and second diagonal members 280, 282 extend from a central portion of the lateral member 284 toward the first and second side rails 210, 212. The forward end portions 286, 288 of the first and second diagonal members 280, 282 are spaced inwardly of the first and second side rails 210, 212. According to one aspect of the present disclosure, and as depicted in FIG. 2, the first and second diagonal members 280, 282 are unitary members. According to another aspect, and as shown in FIG. 5, each of the first and second diagonal members 280, 282 of the front frame structure 250 includes a respective forward member 310, 312 and a separate respective rearward member 316, 318 connected to the forward member. In the depicted embodiment, each forward member 310, 312 has a length smaller than a length of each rearward member 316, 318. The forward members are connected to the cross-member 222, which as indicated above separates the front subframe 240 from the front frame structure 250. The rearward members 314, 316 converge toward one another and are connected to a central portion 320 of the lateral member 284. As shown in FIG. 6, the front frame structure 250 further includes a stiffening member secured to each of the first and second side rails 210, 212 (only stiffening member 322 secured to side rail 210 is depicted). Each stiffening member is laterally aligned with the lateral member 284 of the front frame structure 250 and is secured to an underside of each first and second side rail 210, 212. Each stiffening member can include at least one strengthening rib 324 which is aligned with the lateral member 284 (and extends substantially normal to each first and second side rail).

The components of the front frame structure 250 are formed of high-tensile, cold rolled steel. Each forward member 310, 312 can be formed of high-tensile steel having a tensile strength equal to or greater than 590 MPa, and more specifically a zinc-plated steel such as JAC590R which has a tensile strength equal to or greater than 590 MPa. Each rearward member 316, 318 can be formed of high-tensile steel having a tensile strength equal to or greater than 980 MPa, and more specifically a zinc-plated steel such as JAC980YL which has a tensile strength equal to or greater than 980 MPa. The lateral member 284 can also be formed of high-tensile steel having a tensile strength equal to or greater than 980 MPa, such as JAC980YL. This is in contrast to the cross-member 122 which is formed of high-tensile steel such as JAC590R. As indicated above cross-member 122 is replaced by the lateral member 284. Finally, each stiffening member 322 can be formed of high-tensile steel having a tensile strength equal to or greater than 590 MPa, such as JAC590R. As is well known in the art, JAC590R and JAC980YL are high-performance high-tensile steels defined according to the Japan Iron and Steel Federation Standard. In this way, the instant embodiment can achieve an increased rigidity of the vehicle body and an increased strength against a narrow offset collision.

Figure 7:
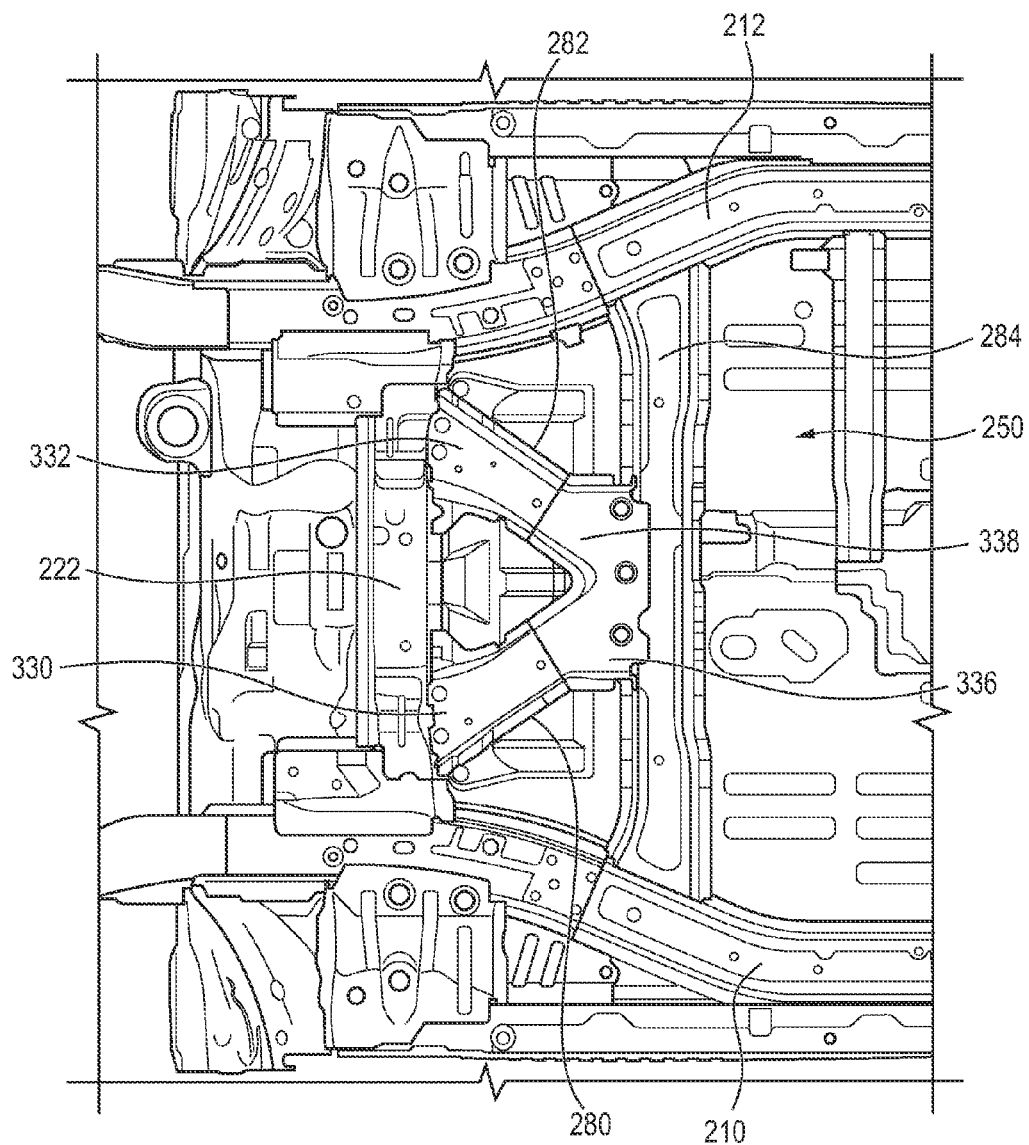
FIG. 7 is a plan view of the front frame structure of FIG. 2 according to another aspect of the present disclosure.

According to yet another aspect, and as depicted in FIG. 7, each of the first and second diagonal members 280, 282 of the front frame structure 250 includes a respective forward member 330, 332 and a separate respective rearward member 336, 338 connected to the forward member. In the depicted embodiment, each forward member 330, 332 is connected to the cross-member 222. The rearward members 334, 336 converge toward one another and are connected to the central portion 320 of the lateral member 284. The rearward members 336, 338 of the first and second diagonal members 280, 282 are integrally formed to define a one-piece rearward member, and this unitary rearward member can have a substantially K-shape. Similar to the embodiment illustrated in FIG. 5, each forward member 330, 332 can be formed of high-tensile steel having a tensile strength equal to or greater than 590 MPa, such as JAC590R. The unitary rearward member 336, 338 and the lateral member 284 can be formed of high-tensile steel having a tensile strength equal to or greater than 980 MPa, such as JAC980YL.

As is evident from the foregoing, as a countermeasure to the overlap frontal impact, the exemplary front frame structure 250 is provided at a location forward of the well 230. The front frame structure 250 includes the diagonal frame members 280, 282 and the lateral member 284, with the diagonal members interconnecting the cross-member 222 and the lateral member 284. In each of the embodiments of the front frame structure 250, each of the diagonal members 280, 282 directs a portion of the crash load from the front subframe 240 to the lateral member 284, transferring crash energy to the unstruck side of the vehicle. Additionally, the diagonal members 280, 282 stabilize the forward portion of the floor 202, preventing floor buckling during a small overlap impact. Thus, the exemplary front frame structure 250 stiffens the forward portion of the floor 202 and reduces the matchboxing effect. Further, because the diagonal members 280, 282 of the front frame structure direct a portion of the crash load to the unstruck side of the vehicle, the front frame structure 250 serves as a load transfer path and floor stabilizer.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle body structure comprising:
a floor connected to a main frame assembly, the main frame assembly includes first and second side rails which extend in a longitudinal direction of the vehicle body structure and a plurality of spaced cross-members interconnecting the first and second side rails; and
a front frame structure located near a forward part of the vehicle body structure and connected to the main frame assembly, the front frame structure includes first and second diagonal members and a laterally extending member, each of the first and second diagonal members includes a forward end portion connected to the main frame assembly and a rearward end portion connected to the lateral member, the rearward end portions converge toward one another and the lateral member has end portions connected to the first and second side rails,
wherein the floor includes a well defined by an opening in the floor, the front frame structure is positioned adjacent to and forward of the well, the well is flanked by one of the cross-members and the lateral member of the front frame structure,
wherein the front frame structure is configured to transfer an impact load to the vehicle body structure caused by a narrow offset frontal collision from the first side rail to the second side rail by transferring the load through the diagonal member extending toward the first side rail, through the lateral member and toward the second side rail, the impact load being transferred away from the well.

2. The vehicle body structure of claim 1, wherein the vehicle body structure further includes a front subframe connected to the main frame assembly and located adjacent to the first and seconds diagonal members of the front frame structure, the front subframe separated from the front frame structure by one of the cross-members.

3. The vehicle body structure of claim 2, wherein the front subframe includes:
first and second longitudinal members which extend in a longitudinal direction of the vehicle body structure;
a front cross-member extending in a transverse direction of the vehicle body structure between front ends of the first and second longitudinal members;
a rear cross-member extending in the transverse direction of the vehicle body structure extend between rear ends of the first and second longitudinal members; and
an engagement member provided at each front end of the first and second longitudinal members, wherein each engagement member is adapted to be engaged by an associated object during the narrow offset frontal collision and direct the impact load into the front subframe.

4. The vehicle body structure of claim 1, wherein each of the first and second diagonal members of the front frame structure includes a forward member and a separate rearward member connected to the forward member.

5. The vehicle body structure of claim 4, wherein the forward member is formed of high-tensile steel having a tensile strength equal to or greater than 590 MPa and the rearward member is formed of high-tensile steel having a tensile strength equal to or greater than 980 MPa.

6. The vehicle body structure of claim 5, wherein the lateral member of the front frame structure is formed of high-tensile steel having a tensile strength equal to or greater than 980 MPa.

7. The vehicle body structure of claim 4, further including a stiffening member secured to each of the first and second side rails, each stiffening member is laterally aligned with the lateral member of the front frame structure.

8. The vehicle body structure of claim 4, wherein the rearward members of the first and second diagonal members are integrally formed to define a one-piece rearward member.

9. The vehicle body structure of claim 4, wherein each of the forward members is connected to one of the cross-members and each of the rearward members is connected to a central portion of the lateral member.

10. A vehicle body structure comprising:
a floor connected to a main frame assembly, the main frame assembly includes first and second side rails which extend in a longitudinal direction of the vehicle body structure and a plurality of spaced cross-members interconnecting the first and second side rails;
a front subframe connected to the main frame assembly; and
a front frame structure located rearward of the front subframe and connected to the main frame assembly, the front frame structure includes first and second diagonal members and a laterally extending member connected to each of the first and second diagonal members, the first and second diagonal members extend from a central portion of the lateral member forward and outward toward the first and second side rails, forward end portions of the first and second diagonal members are spaced inwardly of the first and second side rails;
wherein each of the first and second diagonal members of the front frame structure includes a forward member and a separate rearward member connected to the forward member, the forward member is connected to one of the cross-members and the rearward member is connected to the lateral member;
wherein the floor includes a well, the front frame structure is positioned adjacent to and forward of the well, and the well is flanked by one of the cross-members and the lateral member of the front frame structure;
wherein the front frame structure is configured to transfer an impact load to the vehicle body structure caused by a narrow offset frontal collision from one of the first side rail and second side rail toward the other of the first side rail and second side rail via the diagonal member extending toward the narrow offset frontal collision and the lateral member.

11. The vehicle body structure of claim 10, wherein the front subframe is separated from the front frame structure by one of the cross-members, the front subframe includes an engagement member as part of the front subframe provided at front ends of the front subframe, wherein each engagement member is adapted to be engaged by an associated object during the narrow offset frontal collision and direct the impact load into the front subframe.

12. The vehicle body structure of claim 10, wherein the rearward members of the first and second diagonal members are integrally formed to define a one-piece rearward member.

13. The vehicle body structure of claim 10, further including a stiffening member secured to each of the first and second side rails, each stiffening member is laterally aligned with the lateral member of the front frame structure.

14. A vehicle body structure comprising:
a floor connected to a main frame assembly, the main frame assembly includes first and second side rails which extend in a longitudinal direction of the vehicle body structure and a plurality of spaced cross-members interconnecting the first and second side rails;
a front subframe connected to the main frame assembly; and
a front frame structure located rearward of the front subframe and connected to the main frame assembly, the front frame structure includes first and second diagonal members and a separate laterally extending member connected to each of the first and second diagonal members, the first and second diagonal members extend from a central portion of the lateral member toward the first and second side rails, wherein each of the first and second diagonal members includes a forward member and a separate rearward member connected to the forward member, the forward member is connected to one of the cross-members and the rearward member is connected to the lateral member, the rearward members of the first and second diagonal members are integrally formed to define a one-piece rearward member directly connected to the lateral member;
wherein the front frame structure is configured to transfer an impact load to the vehicle body structure caused by a narrow offset frontal collision from one of the first side rail and second side rail toward the other of the first side rail and second side rail via the diagonal member extending toward the narrow offset frontal collision and the lateral member.

15. The vehicle body structure of claim 14, wherein the floor includes a well, the front frame structure is positioned adjacent to and forward of the well, and the well is flanked by one of the cross-members and the lateral member of the front frame structure.

* * * * *